United States Patent [19]

Lupoli

[11] 4,401,972
[45] Aug. 30, 1983

[54] STOP-LIGHT MONITOR DEVICE

[75] Inventor: Peter J. Lupoli, Hamden, Conn.

[73] Assignee: Sun Chemical Corporation, New York, N.Y.

[21] Appl. No.: 273,064

[22] Filed: Jun. 15, 1981

[51] Int. Cl.³ .............................................. B60Q 1/26
[52] U.S. Cl. ...................................... 340/80; 340/71; 340/79; 340/635; 340/641
[58] Field of Search .................. 340/80, 79, 81 R, 67, 340/69, 71, 74, 635, 641, 642; 315/76, 77, 82, 83; 307/10 LS

[56] References Cited

U.S. PATENT DOCUMENTS 3,852,733 12/1974 Sakurai ................................. 340/80
3,868,628 2/1975 Sakurai ................................. 340/80
4,055,831 10/1977 Sakurai et al. ....................... 340/80

Primary Examiner—Donnie L. Crosland
Attorney, Agent, or Firm—Cynthia Berlow

[57] ABSTRACT

A stop-light monitor device includes a source of current, a lighting circuit connected with the source and having a stop-light switch actuated by the brake pedal. The lighting circuit has incandescent lamps which are energized when the brake pedal is depressed. A magnetic reed switch is influenced to closed position by a permanent magnet, and is connected to control a solid-state switch which in turn controls a pilot light that becomes illuminated when the solid-state switch is closed in consequence of the reed switch being opened. A current-sensitive coil connected with the lighting circuit, opens the reed switch in response to normal energization of the stop lights, whereby the pilot lamp is energized. If a stop light burns out, the reed switch closes, opening the solid-state switch whereby the pilot light is extinguished, giving an indication of the malfunction.

8 Claims, 3 Drawing Figures

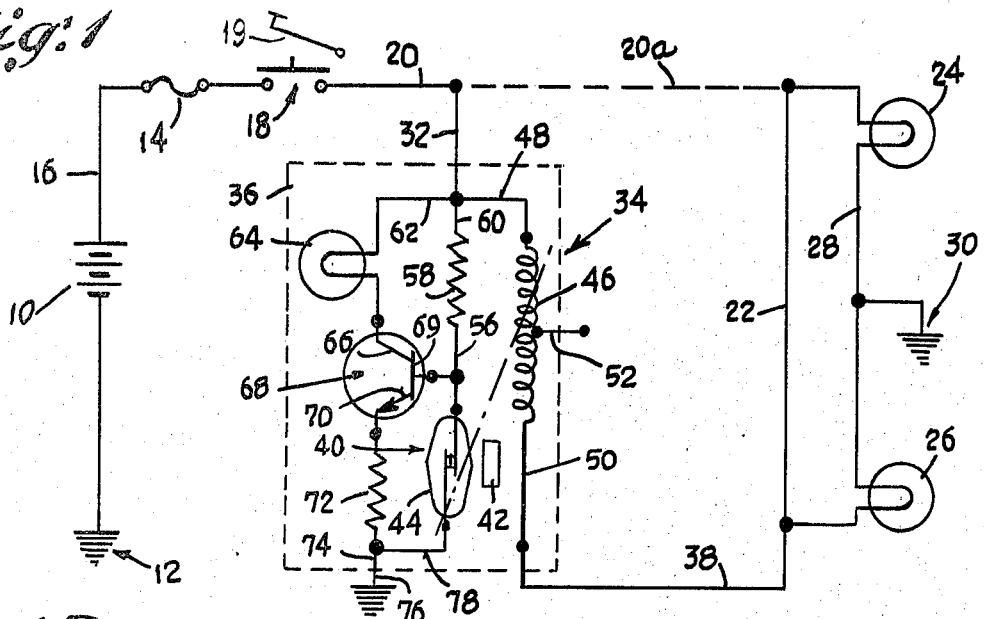
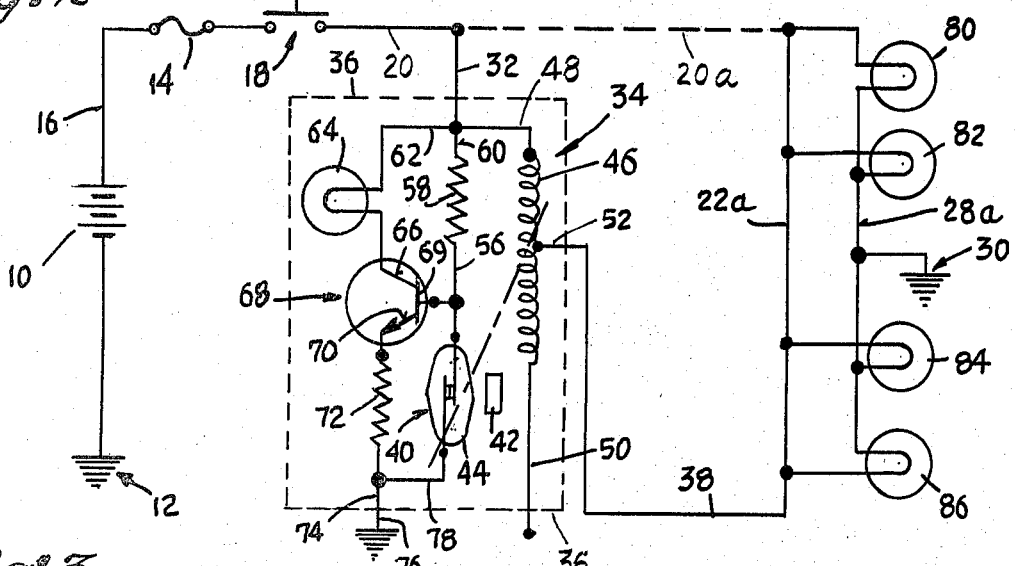
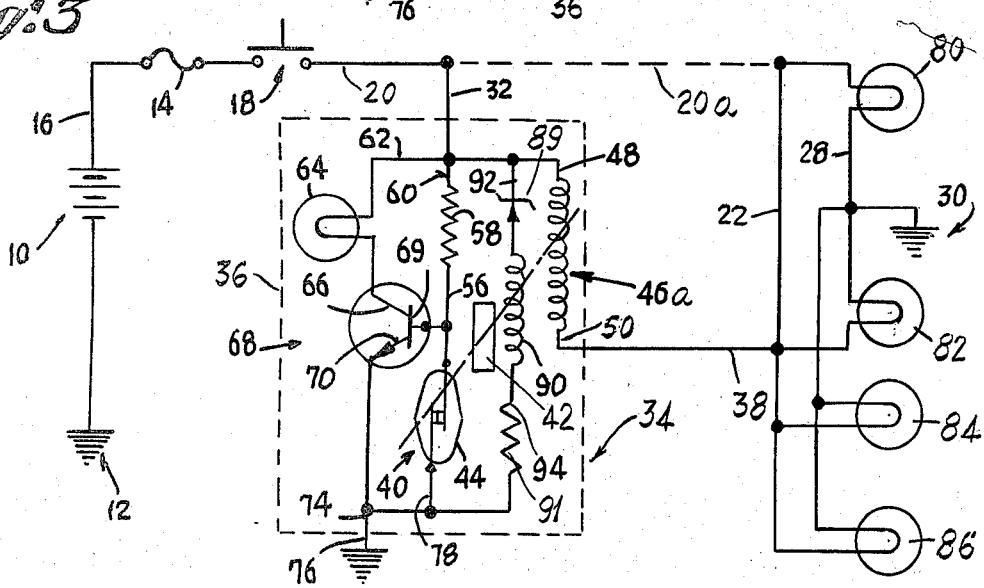

1

STOP-LIGHT MONITOR DEVICE

BACKGROUND

This invention relates to stop-light monitor devices, and more particularly to devices of this type as used in automobiles, in connection with incandescent electric lamps.

In the past a number of different lamp-outage or monitor devices have been proposed and produced for the purpose of indicating malfunctioning of one or several incandescent stop lamps in an automobile. One such device has a flashing-type relay with two coils that buck each other, the flux from one coil being sensitive to the functioning or malfunctioning of the signal lamps. The relay construction, involving bucking coils wound on a magnetic core, represented an appreciable expense and further involved a nicety of adjustment which did not readily lend itself to universal installation. The added cost of the relay was a distinct drawback.

Another prior device also utilized a relay with bucking coils, but the cost was kept down by resorting to encapsulated reed elements. In this device, however, the pilot or indicator lamp did not become energized so as to reveal the normal operation of the stop lamps, but the reverse was true, i.e. the indicator lamp would light up to signal a malfunction. Also, the reed switch was called upon to carry the entire current of the indicator lamp, and these two characteristics constituted drawbacks which reduced the effectiveness and desirability of the device.

Yet another prior device relied upon the surge value which occurred initially, when the incandescent stop lamps were energized. Such reliance on a surge value was considered undesirable, since malfunctioning of the device could occur under certain conditions of use, as for example where a momentary short circuit occured, or where there existed a low resistance leak to ground.

In still another prior device a switch, such as a brake switch for example, was connected in a circuit that caused current to flow through the stop lamps without illuminating them, when the switch was open. This represented an undesirable drain of current from the battery.

Still other prior devices utilized a plurality of silicon-controlled rectifiers and a Zener diode in series with one of two bucking coils, or else an arrangement having multiple switches, in providing the indication of malfunctioning. Here, again, the increased cost was an important factor and an undesirable characteristic, as well as the greater complexity of the circuitry.

SUMMARY

The above disadvantages and drawbacks of prior lamp-outage indicating devices are obviated by the present invention, which has for one object the provision of a novel and improved monitor device that is especially low in cost utilizing relatively few components, and that provides a kindred-type of indication as to the operability of the stop lamps. That is, the indicator light will be illuminated if the stop lights are properly illuminated, and vice versa.

Another object of the invention is to provide an improved signal lamp monitor device in accordance with the foregoing, which is especially reliable in its operation, and is capable of having an extended useful life without failure or servicing.

A feature of the invention resides in the provision of an improved monitor device as above characterized, which will provide a momentary indication as to its operability and proper functioning even when the indicator light is not being energized in consequence of a malfunction of one or several of the stop lamps.

Still another object of the invention is to provide an improved monitor device for the stop lights of an automobile, as above set forth, wherein the device is in the form of an aftermarket attachment that can be easily installed in existing cars by merely breaking into the energizing lead for the lights, and inserting the device therein.

In accomplishing the above objects the invention provides, in conjunction with a source of current such as the car battery and the stop-light circuitry connected therewith, including the switch that is actuated when the brake pedal is depressed and the plurality of incandescent stop lamps connected with said circuitry, a magnetic reed switch having means for providing opposed fluxes (such as a pair of bucking coils, or coils and a permanent magnet). Further there is provided a solid-state switch and control circuitry by which the solid-state switch is closed when the reed switch opens. The coil or coils of the reed switch constitute a current-sensitive means which have the effect of opening the reed switch in response to normal energization of the stop lamps. Such current-sensitive means permits closing of the reed switch if there is below-normal energization, as by burn-out of a stop lamp. A pilot indicator or light is connected with the solid-state switch and is rendered operative in response to the closed condition of the latter (which results if the reed switch becomes open due to normal energization of the stop lamp means).

In one embodiment of the invention a pair of stop lamps is provided, connected in parallel with each other and in a manner such that the current for the lamps passes through a coil of few turns associated with the reed switch. A permanent magnet normally holds the reed switch closed against its spring action which would otherwise hold it open, and the full load current through the coil opposes the permanent magnet and opens the reed switch, closing the solid-state switch and energizing the pilot lamp.

In another embodiment of the invention, wherein four stop lamp bulbs are utilized, connection is made to the coil at a point intermediate its ends whereby fewer turns of the coil are energized, to provide approximately the same flux as the full coil when only two lamps are utilized.

In a third embodiment of the invention, having four incandescent stop lamps, two coils and a permanent magnet are associated with the reed switch. The magnet tends to keep the reed switch closed, and one coil which is responsive to the current through the stop lamps, can oppose the magnet if the lamps are functioning normally, so as to result in the opening of the reed switch and closing of the solid-state switch to provide the normal pilot light indication. The second coil can partly negate the flux of the first coil when the supply voltage varies upward, to prevent a false indication.

Other features and advantages will hereinafter appear.

In the accompanying drawings:

FIG. 1 is a schematic circuit diagram of a stop-light monitor device embodying the invention, as used in connection with two incandescent lamps.

FIG. 2 is a schematic diagram of the device of FIG. 1 but utilizing four incandescent stop lamps, and FIG. 3 is a schematic circuit diagram of a stop-light monitor device constituting another embodiment of the invention where a second coil can reinforce the flux of the permanent magnet under higher supply voltages.

Referring first to FIG. 1, the automobile battery is indicated at 10, having a ground connection at 12 and a fuse 14 in its circuit comprising the hot lead 16. The wire 16 connects with the stop-light switch 18, which latter has a wire 20 that normally connects to the feed wire 22 for stop lamps 24, 26. The lamps 24, 26 are hooked in parallel by a jumper wire 28 which connects to a ground 30. The brake pedal is at 19.

In accordance with the present invention, the wire 20 (shown as originally having an accessible portion 20a indicated by broken lines) is interrupted by severing the accessible portion and inserting sensing circuitry, as by connecting to the wire 20 a lead 32 from a monitor unit 34 which is generally indicated by a broken rectangular outline 36. From the monitor unit 34 a lead 38 connects with the wire 22 going to the lamps 24, 26.

The monitor unit 34 comprises a reed switch 40 which is normally mechanically biased to its open position and can be pulled to its closed position by a permanent magnet 42 that is disposed in close proximity to the envelope 44 of the reed switch.

A bucking coil 46 provided in the unit 34 has one end connected by a wire 48 to the lead 32, and has its other end connected by a wire 50 to the lead 38. The coil 46 has a third connection or tap 52 intermediate its ends, the purpose of which will be described below.

The coil 46 is disposed in close proximity to the reed switch 40, and can encircle the envelope 44. It is arranged to oppose the flux of the permanent magnet 42 when sufficient current flows through the coil, as when both of the lamps 24, 26 are energized, whereby the reed switch opens. This can occur when the brake switch 18 is closed in response to depressing the brake pedal of the car (not shown); for normal functioning of the lamps 24, 26 the reed switch 40 will thus be open during braking.

One terminal of the reed switch is connected by a wire 56 through a resistor 58 and wire 60 to the lead 32 of the monitor device, and such lead is also connected by a wire 62 to an indicator light 64 which in turn is connected to the collector 66 of a transistor device 68 whose base 69 is connected to the wire 56. The emitter 70 of the transistor is connected to a resistor 72 which is in turn connected by a wire 74 to a grounding lead 76, and the wire 74 is also connected by a wire 78 to the remaining terminal of the reed switch 40.

The transistor 68 constitutes a solid-state switch which is rendered conducting whenever the reed switch 40 opens, as for example during braking with the stop lamps 24, 26 normally energized. For such condition, the indicator lamp 64 will also be energized. If one or both of the lamps 24, 26 should malfunction, the current in the bucking coil 46 will be reduced and the flux of the permanent magnet 42 will prevail, retaining the reed switch 40 in its closed condition whereby the transistor 68 remains open and the indicator light 64 will not be energized. This indicates a malfunction of one or both of the brake lights 24, 26 or in the circuitry which energizes such lights.

It should be noted that in the event of a short circuit in the wiring to the stop lamps 24, 26 the pilot light 64 may momentarily become energized during braking but then the fuse 14 will blow and immediately extinguish the light, thereby indicating that a fault exists. If only one of the lamps 24, 26 functions normally and the other lamp is burned out, a surge current of high value which initially flows in the coil 46 will cause a momentary energization of the pilot light 64, which will then immediately become extinguished as the circuit current drops and the reed switch 40 remains closed after its initial opening under the surge condition. This is an important feature of the present invention since it indicates to the user that the monitor device is in operative condition and that actually one of the stop lamps has burned out.

Another embodiment of the invention is illustrated in FIG. 2, wherein similar characters of reference are used to denote like components. In this figure, four stop lamps 80, 82, 84 and 86 are utilized, connected in parallel by wires 22a and 28a. For such arrangement, the wire 28 is not connected with the lead wire 50 of the monitoring unit 34 but instead is connected with the intermediate wire or tap 52 of the coil 46.

The functioning of the circuit of FIG. 2 is essentially the same as that described in connection with FIG. 1, with the exception that the four stop lamps of FIG. 2 draw heavier current and accordingly the ampere turns of the coil 46 are adjusted to the heavier current by utilizing fewer turns.

Still another embodiment of the invention having four stop lamps is illustrated in FIG. 3, wherein like components again have been given reference characters similar to those of FIGS. 1 and 2.

The permanent magnet 42 of FIGS. 1 and 2 is retained in FIG. 3 and backed up by a second or aiding coil 90 which has one end connected to a zener diode 89 and by a wire 92 to the wires 32 and 48, and has its other end connected by a wire 94 to a resistor 91 which is joined to the wires 74 and 78.

When the brake switch 18 is closed, as by depressing the brake pedal, the coil 90 will not be strongly energized unless the supply voltage from the battery 10 and car alternator (not shown) are in the high range. Therefore, for the lower voltage ranges, it will not appreciably tend to close the reed switch 40, and such closing will be effected mainly by the permanent magnet 42. This closed condition of the reed switch 40 will only be maintained, however, if the stop lamps 80-86 are not properly functioning, since the bucking coil 46a will oppose the flux of the magnet 42 and the very weak flux of the coil 90 whereby the reed switch 40 will revert to its mechanically biased open condition. For such circumstance, the transistor 40 will be rendered conducting, resulting in the pilot light 64 being energized to indicate the proper functioning of the lamps 80-86. If, however one of the lamps should have burned out, the current through the coil 46a will be insufficient to fully oppose the flux of the magnet 42 and the reed switch 40 will thereby remain closed, rendering the transistor 68 nonconducting whereby the pilot light 64 will not be energized. This will indicate the burn-out of one of the bulbs 80-86.

The coil 90 and zener diode 89 with resistor 91 constitute a safety feature which insures against malfunction of the device in those cases where occasionally the car voltage is in the higher range, as for example at 15 or 16 volts. In this case, the division of voltage between the coil 90, resistor 94 and zener diode 89 is such that the diode fires or conducts (being subjected to more than six volts). Then, the flux of the coil 90 is greatly strengthened, aiding appreciably the flux of the permanent magnet 42 whereby the coil 46a will not be strong enough, with one or more of the lamps 80–86 burned out, to oppose the magnet flux and open the reed switch 40 and close the transistor switch 68 and light the lamp 64. A false signal is thus averted.

Typical data for the circuit of FIG. 3 are as follows: The transistor 68 can be type 2N3903; the resistor 58 can be 1.2K ohms; the resistor 94 can be 220 ohms; the bucking coil 46a can be 7 turns of No. 18 wire and the aiding coil 90 can be 500 turns of No. 40 wire. The magnet 42 can have a flux strength of 5–6 gauss.

It will now be seen from the foregoing that I have provided an especially simple and inexpensive monitor device in the form of an easily applied attachment, which will indicate the burn-out of one or more of the stop lamps, by virtue of the indicator light initially flashing on and then quickly going off. If the stop lamps are in proper working order, the indicator light will also be lighted simultaneously, thereby providing a kindred type of indication. Relatively few components are involved, and the monitor device can be easily and quickly installed in existing automobiles by merely inserting it in the circuit for the stop lamps, as indicated.

Variations and modifications are possible without departing from the spirit of the claims.

I claim:

1. A stop-light monitor device for an automobile comprising, in combination:
    (a) a source of current,
    (b) a lighting circuit connected with said source of current,
    (c) a stop-light switch connected in said lighting circuit,
    (d) an operable member for actuating the stop-light switch,
    (e) incandescent stop-lamp means connected in said lighting circuit and adapted to be energized when the stop-light switch is closed,
    (f) a magnetic reed switch spring biased to open position,
    (g) a solid state switch,
    (h) means including a control circuit connected with the reed switch and solid-state switch, for closing the latter when the reed switch opens,
    (i) a permanent magnet disposed in close proximity to the reed switch and adapted to maintain the same normally in closed condition against its spring bias action,
    (j) current-sensitive means connected with said lighting circuit, for opening the reed switch in response to normal current supplied for energization of the stop-lamp means, said current-sensitive means maintaining the reed switch in a closed state if there is below-normal current supplied for the energization of the stop-lamp means, and
    (k) a pilot indicator connected with the solid-state switch and rendered operative in response to a closed condition of said solid-state switch.

2. A stop-light monitor device as in claim 1, wherein:
    (a) said current-sensitive means includes a bucking coil connected to carry the lighting current for the stop-lamp means,
    (b) said bucking coil being disposed in close proximity to said reed switch.

3. A stop-light monitor device as in claim 2, and further including:
    (a) a magnet coil connected with said lighting circuit and disposed in close proximity to the reed switch,
    (b) said magnet coil tending to maintain the reed switch normally in closed condition when the stop-light switch is closed.

4. A stop-light monitor device as in claim 2, wherein:
    (a) said stop-lamp means comprises four incandescent bulbs,
    (b) said bucking coil having a connection intermediate its ends whereby a portion only of the total turns can be used to carry the lighting current,
    (c) said intermediate connection being connected to said light circuit.

5. A stop-light monitor device as in claim 1, wherein:
    (a) said stop-lamp means comprises four incandescent bulbs,
    (b) said bucking coil having a connection intermediate its ends whereby a portion only of the total turns can be used to carry the lighting current,
    (c) said intermediate connection being connected to said lighting circuit.

6. A stop-light monitor device as in claim 3, wherein:
    (a) said current sensitive means comprises means connected with the magnet coil, operable only in response to voltages in the higher voltage range of the source of current, for rendering the said magnet coil fully operative to aid the permanent magnet and oppose the bucking coil.

7. A stop light monitor device as in claim 6, wherein:
    (a) said means operable in response to higher voltages comprises a zener diode connected in series with the magnet coil.

8. A stop light monitor device as in claim 7, and further including:
    (a) a resistor connected in series with the magnet coil and zener diode, for holding the voltage across the diode to a predetermined value normally below its firing value except for the higher voltage ranges of the current source.

* * * * *